United States Patent
Krupka et al.

(10) Patent No.: US 8,756,174 B2
(45) Date of Patent: *Jun. 17, 2014

(54) FORWARD FEATURE SELECTION FOR SUPPORT VECTOR MACHINES

(75) Inventors: Eyal Krupka, Shimshit (IL); Aharon Bar-Hillel, Kiryat-Ono (IL)

(73) Assignee: Intel Corporation, Santa Clara, CA (US)

(*) Notice: Subject to any disclaimer, the term of this patent is extended or adjusted under 35 U.S.C. 154(b) by 210 days.

This patent is subject to a terminal disclaimer.

(21) Appl. No.: 13/334,313

(22) Filed: Dec. 22, 2011

(65) Prior Publication Data

US 2012/0095944 A1 Apr. 19, 2012

Related U.S. Application Data

(63) Continuation of application No. 12/152,568, filed on May 15, 2008, now Pat. No. 8,108,324.

(51) Int. Cl.
G06F 15/18 (2006.01)

(52) U.S. Cl.
USPC .......................................................... 706/12

(58) Field of Classification Search
None
See application file for complete search history.

(56) References Cited

U.S. PATENT DOCUMENTS

| | | |
|---|---|---|
| 6,789,069 B1 | 9/2004 | Barnhill et al. |
| 7,117,188 B2 | 10/2006 | Guyon et al. |
| 7,475,048 B2 | 1/2009 | Weston et al. |
| 2011/0106735 A1 | 5/2011 | Weston et al. |

OTHER PUBLICATIONS

Christopher J.C. Burges, "A Tutorial on Support Vector Machines for Pattern Recognition," 1998, pp. 121-167.
Isabelle Guyon, et al., "Gene Selection for Cancer Classification Using Support Vector Machines," 2002, pp. 1-39.
Simon Perkins, et al., "Grafting: Fast, Incremental Feature Selection by Gradient Descent in Function Space," J. Mach. Learn. Res. Mar. 3, 2003, pp. 1333-1356.
Daniel J. Garcia, et al., "A Parallel Feature Selection Algorithm From Random Subsets," Proceedings of the 17th European Conference on Machine Learning and the 10th European Conference on Principles and Practice of Knowledge Discovery in Databases, Berlin, Germany, Sep. 18-22, 2006.

*Primary Examiner* — Jeffrey A Gaffin
*Assistant Examiner* — David H Kim
(74) *Attorney, Agent, or Firm* — Trop, Pruner & Hu, P.C.

(57) ABSTRACT

In one embodiment, the present invention includes a method for training a Support Vector Machine (SVM) on a subset of features (d') of a feature set having (d) features of a plurality of training instances to obtain a weight per instance, approximating a quality for the d features of the feature set using the weight per instance, ranking the d features of the feature set based on the approximated quality, and selecting a subset (q) of the features of the feature set based on the ranked approximated quality. Other embodiments are described and claimed.

20 Claims, 4 Drawing Sheets

FORWARD FEATURE SELECTION FOR SUPPORT VECTOR MACHINES

This application is a continuation of U.S. patent application Ser. No. 12/152,568, filed May 15, 2008, now U.S. Pat. No. 8,108,324, issued on Jan. 31, 2012, the content of which is hereby incorporated by reference.

BACKGROUND

A Support Vector Machine (SVM) is a powerful tool for learning pattern classification. An SVM algorithm accepts as input a training set of labeled data instances. Each data instance is described by a vector of features, which may be of very high dimension, and the label of an instance is a binary variable that separates the instances into two types. The SVM learns a classification rule that can then be used to predict the label of unseen data instances.

For example, in an object recognition task, the algorithm accepts example images of a target object (e.g., a car) and other objects, and learns to classify whether a new image contains a car. The output of the SVM learning algorithm is a weight (which may be positive or negative) that is applied to each of the features, and which is then used for classification. A large positive weight means that the feature is likely to have high values for matching patterns (e.g., a car was detected), and vice versa. The prediction of a label is then made by combining (summing) the weighted votes of all features and comparing the result to a threshold level.

The features used by the algorithm can be raw features (e.g., pixel gray level) or more complex calculated features such as lines, edges, textures. In many real-world applications, there is a huge set of candidates of features (which can easily reach millions). However, working with such a huge set, even on modern computer systems, is usually infeasible, and such a classifier is thus very inefficient.

DETAILED DESCRIPTION

Figure 1:
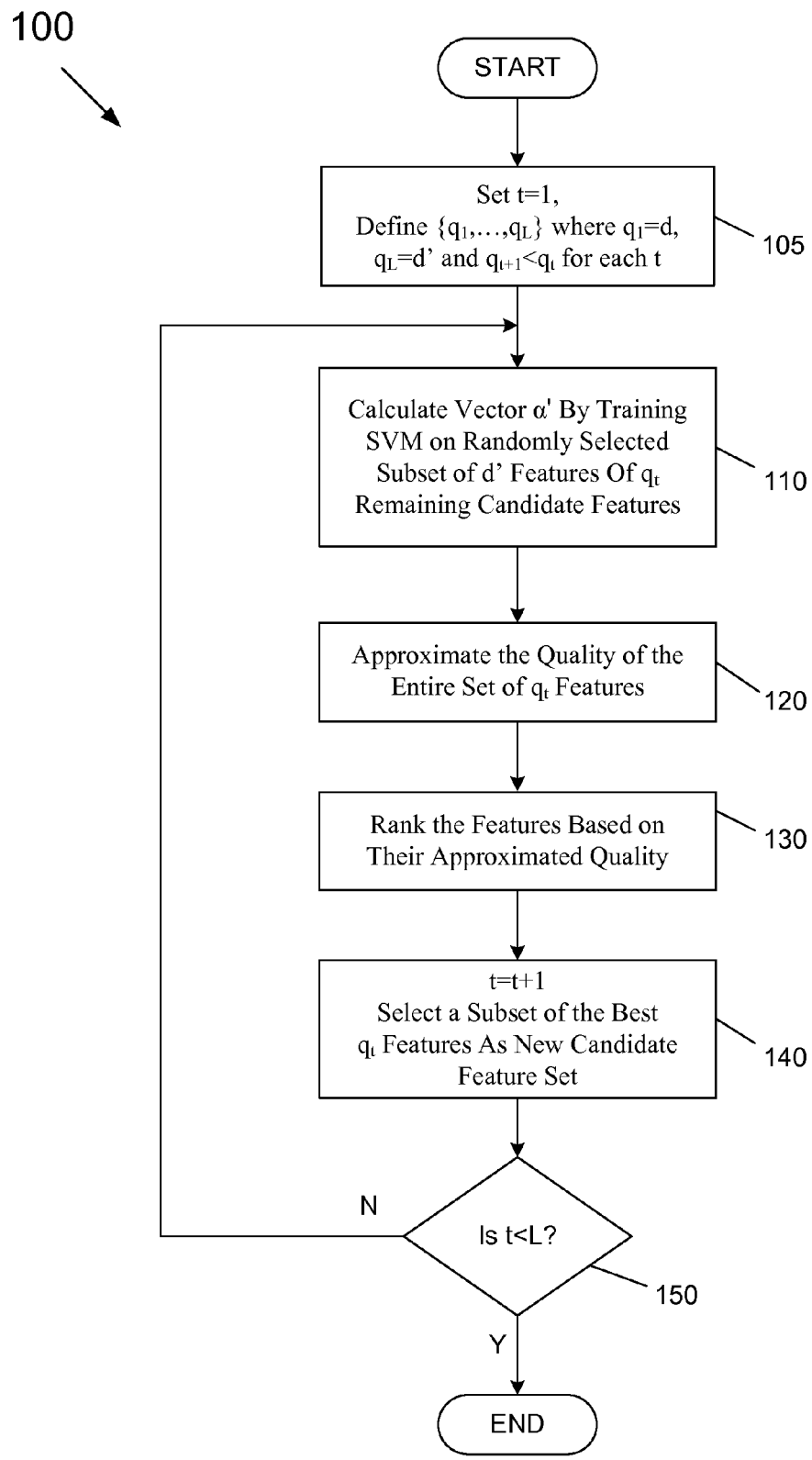
FIG. 1 is a flow diagram of a method in accordance with one embodiment of the present invention.

In various embodiments, a feature selection method is provided for use with support vector machines (SVMs). More specifically, embodiments of the present invention can provide for highly efficient feature selection for large scale learning problems without diminution in accuracy. As will be described further herein, in one implementation a SVM-forward feature selection (SVM-FFS) algorithm may be used to perform machine learning/pattern recognition with high accuracy and efficiency.

For purposes of example, assume a computer is to perform a task for handwritten digital identification. To do this, a learning algorithm is provided, and is given examples of images of the digits, e.g., 1,000 images of the digits. Each such image has multiple features. The type of features in the sample feature in case of images of digits can be the pixel grey level. For example, the first feature may be a first pixel. In other cases, the features may be more complex, for example, decide that a feature is the multiplication of some pixels. For example, the first feature may be a multiplication of the first pixel with another pixel. In general, the number of features may be arbitrarily large. The result of the training is a classifier that can then be used to receive unlabeled data (e.g., a digital image) and perform analysis to recognize the new digit. Some instances of digits are hard to classify and the SVM focuses on the instances that are hard to classify by giving these instances large weights.

As will be described further below, the SVM-FFS algorithm can be used to perform training of a linear SVM on a relatively small, random subset of an entire set of candidate features. Based on the results, a relatively small subset of good features can be selected. In this way, the computation expense of training the SVM on all candidate features of a feature set can be avoided.

That is, SVMs typically operate by performing training on all features of a feature set. During such training, the algorithm accepts as input a labeled sample $\{\vec{X}_i, y_i\}_{i=1}^N$, where $\vec{X}_i = (x_i^1, \ldots, x_i^d) \in R^d$ (which is a training vector) and $y_i \in \{+1, -1\}$ is a label indicating the class of $\vec{X}_i$. During training, a weight vector $\vec{W} = (w_1, \ldots, w_d)$ is optimized to separate between the two classes of vectors. This can be done by standard SVM solver, for example, by solving a quadratic programming problem. The optimal $\vec{W}$ can be expressed as a linear combination of the training examples:

$$\vec{W} = \sum_{i=1}^N \alpha_i y_i \vec{X}_i, \forall_i \, \alpha_i > 0 \qquad [\text{EQ. 1}]$$

where N is the number of instances, y is the label, and $\vec{X}$ is the training vector, and instance weights $\{\alpha_i\}_{i=1}^N$ are computed during the training. After training, the classification of a new example is done by calculating the dot product between the weight vector and the new example, i.e., $\vec{W} \cdot \vec{X}$.

Note that a SVM does not calculate feature weights directly, but first assigns a weight to each input instance (e.g., in dual representation). This creates a vector a of length N (corresponding to the number of training instances). The value of $\vec{\alpha}$ weight assigned to an example reflects its dominance in defining the decision boundary between the two classes. Each feature weight is then computed based on this $\vec{\alpha}$ vector (multiplied by the label vector) and the N-size vector containing the feature values for all the instances.

When, however, the dimension d of the feature set is very high, the accuracy of the classifier often degrades, and the computational cost of both training and classification can increase dramatically. Thus in various embodiments, a feature selection may be performed to reduce to d to d', where d'<<d.

Thus the output of a SVM is a set of parameters $\{\alpha_i\}_{i=1}^N$ that is used to calculate the weights $w_j$, and the ranking criteria of the jth feature is $$Q_j = w_j^2 = \left(\sum_{i=1}^N \alpha_i y_i x_i^j\right)^2. \qquad [\text{EQ. 2}]$$

We define the quality of features as the square value of weight. Equivalent defining, which leads to the same ranking is the absolute value of weight, as only the order of quality values matters.

In an iterative process, the features with lowest ranking criteria are dropped, and the iterations continue until a much smaller number of remaining features are left. That is, absolute weights that are less than a minimum absolute weight, which may be very close to zero, are excluded from further training, and thus for further iterations these features are not used anymore. However, in conventional recursive feature elimination for SVM (SVM-RFE) implementations to perform this feature selection process, a long time is needed. In some implementations, 10's or even 100's iterations may be needed depending on a context-specific algorithm. Note that typically the first number of iterations takes a long time to be performed, and later iterations are shorter due to a smaller feature set. The computational bottleneck is in the first iterations, when a potentially huge number of features need to be solved by the SVM. The complexity of running R rounds of a conventional SVM is $\Theta(N^2 dR)$, which is prohibitive when both N and d are large.

Thus in various embodiments, instead of repeated feature elimination, a first SVM iteration is performed only on a small subset of features (d'), rather than all of such features d. In this first iteration, this small subset of features is randomly selected from the full feature set. In later iterations, the SVM can be performed on the same size of d' features, but in this case the features with low absolute weights are replaced with better ones. To realize this, the weights of features that do not participate in a training of SVM can be approximated. There is not a significant difference in the result weight between the weight estimate and the weight determined using all features. In many instances, the weight estimation is good enough to reduce to a subset of four hundred (e.g., of out of a half million features), and then drop the least weighted features. Large performance gains using embodiments of the present invention can be realized, as SVM training is provided on a very small subset of features, rather than all features of training instances.

As such, in a SVM-FFS algorithm an $\vec{\alpha}'$ vector can be computed by running the SVM on a relatively small random subset of features (i.e., as performed in block 110 of FIG. 1, described below). The quality for features which were not seen during the SVM training are approximated using this $\vec{\alpha}'$ vector (see EQ. 3, described below) instead of a $\vec{\alpha}$ vector. Note that exact weights can only be computed using vector $\vec{\alpha}$ (EQ. 1), but this requires training the SVM on all of the d features, which is typically very computationally intensive, as described above. However, in most practical cases using the approximate $\vec{\alpha}'$ vector gives highly accurate approximations for the feature weights.

Referring now to FIG. 1, shown is a flow diagram of a method in accordance with one embodiment of the present invention. Specifically, method 100 of FIG. 1 may correspond to a SVM-FFS algorithm in accordance with one embodiment of the present invention. As shown in FIG. 1, method 100 may begin at block 105 in which an iteration counter t is set to 1, and a number of remaining candidate features per iteration $q_1, \ldots, q_L$ may be defined, where $q_1$ equals d and $q_L$ equals d', and $q_{t+1}$ is less than $q_t$ for each iteration t. L is the total number of iterations. Note that $q_t$ may correspond to a value that determines the number of candidate features to keep after iteration t. More specifically, $q_t$ may correspond to the number of features with the highest quality, as described further below. Thereafter training a linear SVM on a subset of d' randomly selected features of the remaining $q_t$ candidate features may occur, where d' is significantly less than all features d of a data set to calculate a vector $\alpha'$ (block 110). In various embodiments, d' of the subset may correspond to a random subset. Understand that the number of d' features may vary widely in different implementations. For example, in a data set having d candidate features, where d is on the order of approximately $1 \times 10^7$ or greater, d' may range from approximately 100-1000, although the scope of the present invention is not limited in this regard. Thus d' may be a factor of 1000 less than d, and can be even a factor of 10,000 less (or more), in some embodiments.

The SVM may be trained by computing SVM weights for the working set corresponding to the d' features. As will be described further below, the output of this training phase may correspond to a weight per instance at dual representation, i.e., $\alpha'$, where $\alpha'$ is determined using a standard SVM solver. This weight per instance may create a vector $\alpha'$ of length N that corresponds to the number of training instances.

Referring still to FIG. 1, next the weights of the entire set of d features may be approximated based on the vector $\alpha'$. That is, the per instance output $\alpha'$ may be applied to obtain each feature weight by $$w'_j = \sum_i \alpha'_i y_i x_i^j.$$

Then, the quality of each feature of the entire set of q features may be approximated (block 120). That is, using the approximated q weights $\alpha_i'$, a quality criteria, for example, $Q_j'$, may be determined for each feature q of the entire feature set using the determined weight values $\alpha'$ according to the following equation:

$$Q'_j = \left(\sum_i \alpha'_i y_i x_i^j\right)^2 \qquad [\text{EQ. 3}]$$

where y and x are as above in EQ. 1, and $\alpha'$ is the approximated weight per instance, described above.

Next, all the features may be ranked based on their approximated quality (block 130). Thereafter, a subset of the best $q_t$ features may be selected as the new candidate feature set, and the iteration number and may be incremented (block 140). Note that $q_t$ is predetermined for each iteration t (as defined in block 105). As one example, suppose that d=1,024,000 d'=1, 000, then reasonable values of $q_t$ may be $q_t=1,024,000/(2^{t-1})$, for t=1, . . . , 10]. Thus block 140 removes from the subset one or more features having a smallest quality criteria (i.e., one or more features having a smallest $Q_j'$), such that an even smaller subset of features including one or more high-$Q_j'$ values replaces features having lower $Q_j'$ values.

Then it may be determined at diamond 150 if the iteration number, t, is less than a predetermined number of iterations, L. If so, method 100 may conclude. Otherwise, another iteration of blocks 110-140 may be performed, beginning at block 110 (with training with a random subset d' selected out of the remaining candidate feature set $q_t$). Multiple such iterations may be performed until the remaining set of features approaches the desired size $q_L$. While shown with this particular implementation in the embodiment of FIG. 1, the scope of the present invention is not limited in this regard. Of course, after obtaining the trained classifier, the classifier may be used to classify (i.e., identify a class of) unlabeled input data, such as a set of images that may pertain to any one of a number of fields such as medical, scientific, identification, or so forth.

Note that even though the weight approximations are based on a classifier with a small number of features, it can be shown empirically that the approximations are highly accurate for moderate d' values (e.g., d' of 100-1000 can be enough for practical purposes, regardless of the size of d). Thus in various embodiments, weight approximation allows a prediction of weights of unseen features based on SVM learned from a small subset of features.

Figure 2:
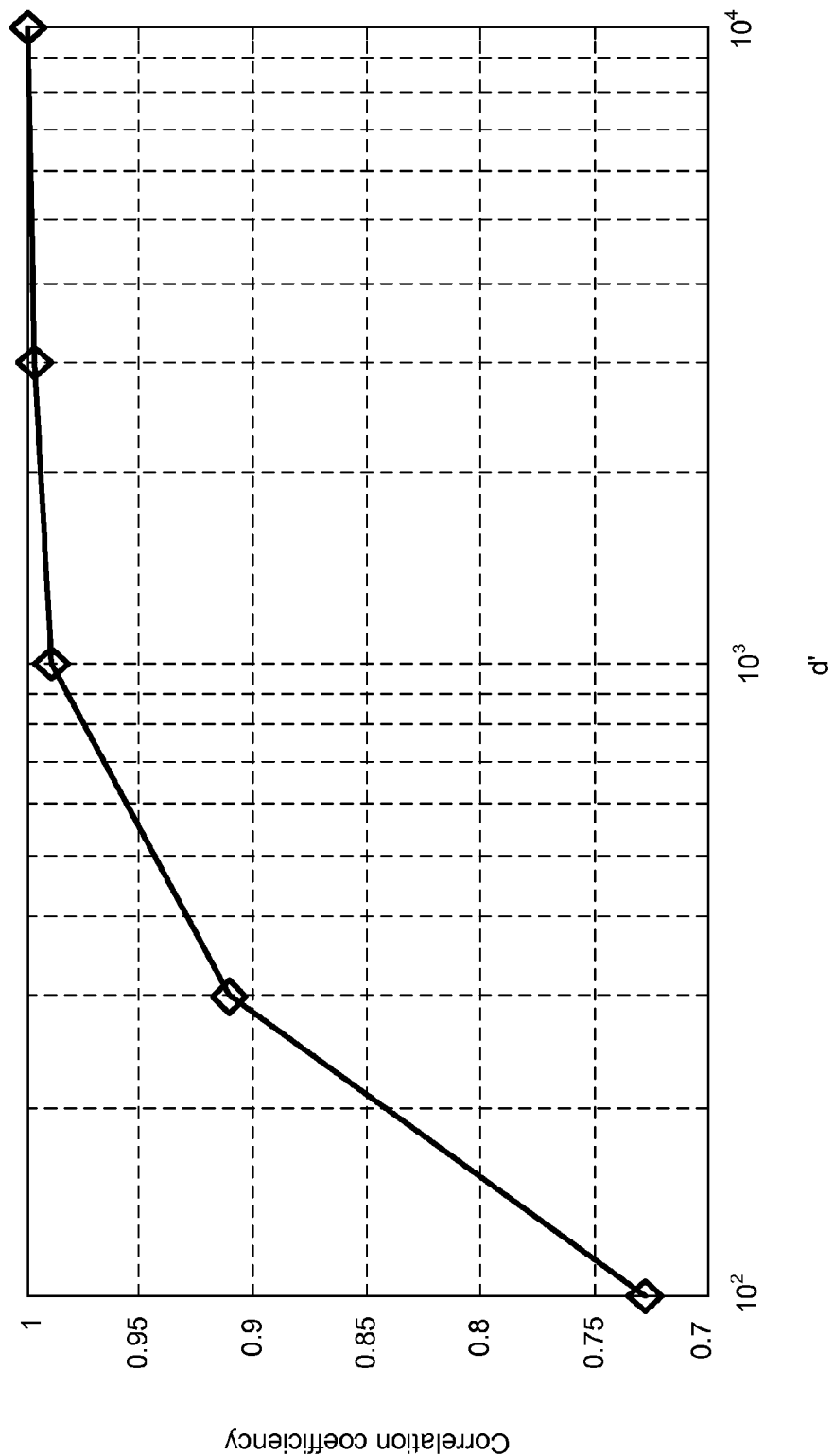
FIG. 2 is a graphical illustration of a correlation coefficient in accordance with one embodiment of the present invention.

For large data sets, the accuracy of the SVM classifier using a SVM-FFS algorithm can be highly accurate if d' is not too small. This occurs since the approximated weights are nearly equal to the estimated weights, as shown in FIG. 2, which is a graphical illustration of a correlation coefficient between approximated and actual weight as a function of d'. Note that for d' above 1000, the correlation is nearly one, although the SVM is training on a relatively small subset of features. However, the total complexity of the SVM-FFS algorithm is $O(k^2d'+kd)$, which is in general a d'/d-fraction of the $O(k^2d+kd)$ complexity of a SVM-RFE system that performs a recursive feature elimination in which each feature of a data set is trained.

Figure 3:
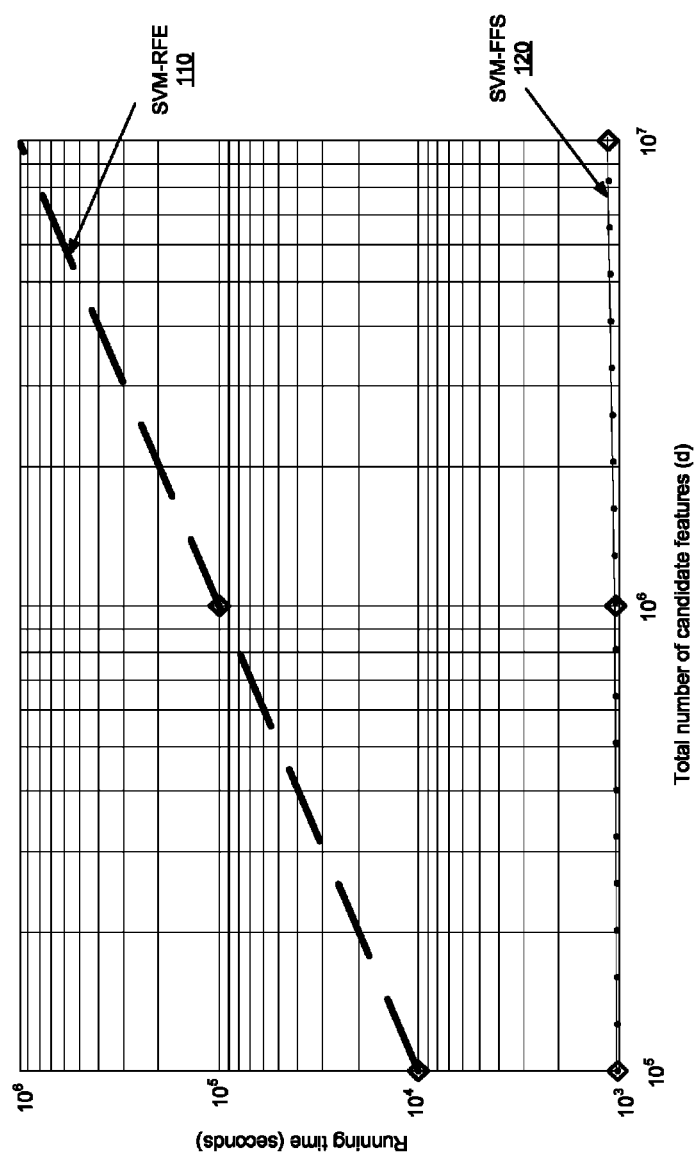
FIG. 3 is a graphical illustration of speed of an embodiment of the present invention compared to a conventional support vector machine (SVM).

FIG. 3 is a graphical illustration of speed of an embodiment of the present invention compared to a recursive feature elimination (RFE) algorithm as a function of candidate feature set size for a handwriting recognition task. It can be seen that SVM-FFS 120 is feasible for a huge set of candidate features, while the alternative method for feature selection (SVM-RFE 110) are suitable only for small or medium-sized sets. For example, one embodiment can be used to select 10,000 monomial features (multiplication of three pixels) out of 50,000,000 candidates, while achieving a classification error rate of 0.3%. Of course, embodiments can be used for other pattern recognition tasks as well. As shown in FIG. 3, the X-axis is the number of features selected from (d). The Y-axis is the running time in seconds on a modern personal computer (PC) (log scale). Selected were 10,000 features, where each feature is a pixel triplet, i.e., multiplication of 3 pixels. The gain of the embodiment relative to a conventional SVM-RFE increases with the number of features, and is nearly 500× faster for d=50,000,000. In turn, this enables better recognition accuracy. The graph of FIG. 3 is based on actual classifier training and extrapolated to a large number of features where running the control SVM-RFE is not feasible due to time and memory constraints.

Embodiments of the present invention can be used for feature selection for SVM in a wide variety of pattern recognition applications (e.g., object recognition, visual defect detection, verification, handwritten recognition, medical diagnosis etc.).

Figure 4:
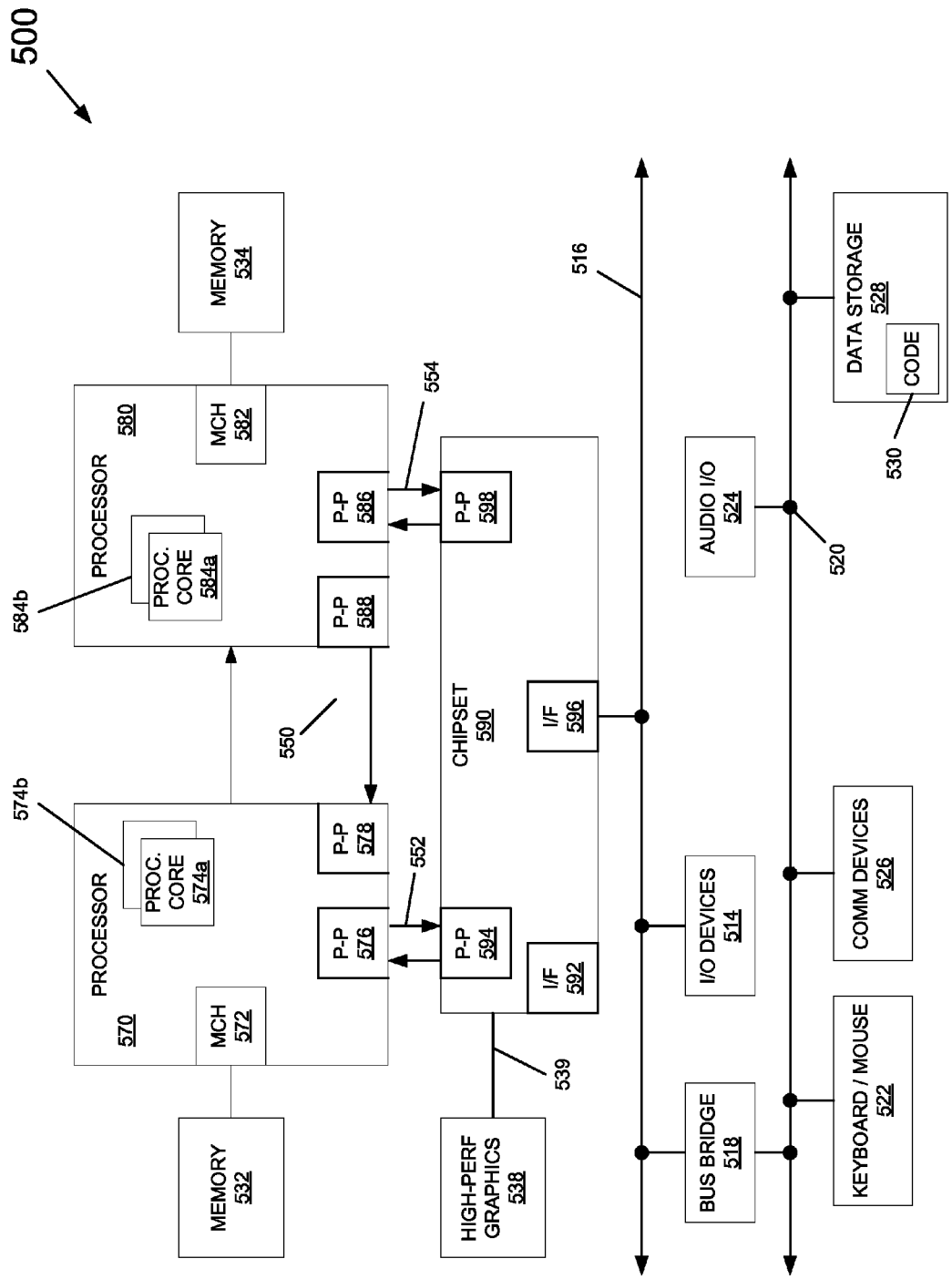
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b), although potentially many more cores may be present in the processors. The processor cores may perform an SVM-FFS algorithm in accordance with an embodiment of the present invention, under control of program instructions stored in one or more storage units of system 500.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 2, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 4, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
defining an iteration counter to a predetermined value;
training, using a processor of a computer system, a Support Vector Machine (SVM) on a subset of features (d') of a feature set having (d) features of a plurality of training instances to obtain a weight per instance ($\vec{\alpha}'$);
approximating a quality for the d features of the feature set using the weight per instance;
ranking the d features of the feature set based on the approximated quality;
selecting a subset (q) of the features of the feature set based on the ranked approximated quality; and
iterating training the SVM, approximating the quality, ranking the d features, and selecting the q subset until the q subset is less than a selected threshold.
2. The method of claim 1, further comprising incrementing the iteration counter.

3. The method of claim 2, further comprising iterating training the SVM, approximating the quality, ranking the d features, and selecting the q subset if the iteration counter is less than a second predetermined value.

4. The method of claim 1, wherein ranking the d features includes comparing rank values each based at least in part on each of the approximated quality to a threshold.

5. The method of claim 4, wherein selecting the q subset includes selecting features having a corresponding approximated quality greater than the threshold.

6. The method of claim 5, further comprising approximating the feature quality by an approximate weighted correlation between instance labels and values for the features.

7. The method of claim 1, wherein d' is substantially less than d and is a random subset of d.

8. The method of claim 7, wherein d' is less than d by at least a factor of one hundred.

9. The method of claim 1, wherein each of the plurality of training instances corresponds to an image.

10. The method of claim 1, wherein the SVM comprises a linear SVM.

11. The method of claim 1, wherein the weight per instance comprises a vector ($\alpha'$) of a length N corresponding to the plurality of training instances.

12. An article comprising a non-transitory machine-accessible medium including instructions that when executed cause a system to:
define an iteration counter to a predetermined value;
train a Support Vector Machine (SVM) according to a forward feature selection algorithm in which only a random subset of features (d') of a feature set (d) of a plurality of training instances are used to obtain a weight per instance ($\alpha'$);
approximate a quality for the d features of the feature set using the weight per instance;
rank the d features of the feature set based on the approximated quality, and select a subset (q) of the features of the feature set based on the ranked approximated quality;
classify unlabeled data using the trained SVM; and
determine whether the q subset is less than a first threshold, and if so conclude the SVM training, and otherwise iterate training the SVM, approximating the quality, ranking the remaining q features from the previous iteration, and selecting the q subset until the q subset is less than the first threshold.

13. The article of claim 12, further comprising instructions to compare rank values each based at least in part on the approximated quality of each of the features to a second threshold.

14. The article of claim 13, further comprising instructions to select the q subset by selecting features having a corresponding approximated quality greater than the second threshold.

15. A system comprising:
a processor to perform instructions; and
a memory coupled to the processor to store instructions that enable the processor to define an iteration counter to a predetermined value, train a Support Vector Machine (SVM) on a subset of features (d') of a feature set having (d) features of a plurality of training instances to obtain a weight per instance, approximate a quality for each of the d features of the feature set using the weight per instance, rank the d features of the feature set based on the approximated quality, select a subset (q) of the features of the feature set based on the ranked approximated quality, determine whether the q subset is less than a first threshold, and if so conclude the SVM training, and iterate training the SVM, approximating the quality, ranking the remaining q features from the previous iteration, and selecting the q subset until the q subset is less than the first threshold if the q subset is greater than the first threshold.

16. The system of claim 15, further comprising instructions to compare rank values each based at least in part on each of the approximated quality to a second threshold.

17. The system of claim 16, further comprising instructions to select features having a corresponding approximated quality greater than the second threshold.

18. The system of claim 15, further comprising instructions to approximate the quality by an approximate weighted correlation between a label per instance and values for the features.

19. The system of claim 15, wherein the SVM is a forward feature selection SVM.

20. The system of claim 15, wherein the d' subset is a random subset.

* * * * *